United States Patent [19]

Brown et al.

[11] 4,246,637
[45] Jan. 20, 1981

[54] DATA PROCESSOR INPUT/OUTPUT CONTROLLER

[75] Inventors: Lewis W. Brown, Boca Raton; Douglas R. Chisholm, Delray Beach; Jerry D. Dixon, Boca Raton, all of Fla.

[73] Assignee: International Business Machines Corporation, Armonk, N.Y.

[21] Appl. No.: 919,107

[22] Filed: Jun. 26, 1978

[51] Int. Cl.³ .................... G06F 3/00; G06F 9/22; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,654,617 | 4/1972 | Irwin | 364/200 |
| 3,673,576 | 6/1972 | Donaldson | 364/200 |
| 3,909,799 | 9/1975 | Recks et al. | 364/200 |
| 3,950,735 | 4/1976 | Patel | 364/200 |
| 4,014,005 | 3/1977 | Fox et al. | 364/200 |
| 4,016,548 | 4/1977 | Law et al. | 364/200 |
| 4,038,642 | 7/1977 | Bouknecht et al. | 364/900 |
| 4,042,911 | 8/1977 | Bourke et al. | 364/900 |
| 4,065,810 | 12/1977 | Cramer et al. | 364/200 |
| 4,075,686 | 2/1978 | Calle et al. | 364/200 |
| 4,075,691 | 2/1978 | Davis et al. | 364/200 |
| 4,093,981 | 6/1978 | McAllister et al. | 364/200 |
| 4,099,236 | 7/1978 | Goodman et al. | 364/200 |
| 4,100,601 | 7/1978 | Kaufman et al. | 364/200 |

OTHER PUBLICATIONS

Callahan et al. "Burst-Mode PIO Bus Control," IBM TOB vol. 21, No. 4 1417-1419.

Primary Examiner—Mark E. Nusbaum
Attorney, Agent, or Firm—Richard E. Bee

[57] ABSTRACT

A data processor input/output controller which is particularly useful as a microcontroller for the transfer of data between a host processor and one or more peripheral input/output devices in a digital data processing system. This input/output (I/O) controller is a subchannel controller for offloading a goodly portion of the subchannel control function from the host processor. This I/O controller includes a microprocessor for assisting and supervising the controller internal operations. Also included in the controller is an automatic high-speed data bypass mechanism whereby data may be transferred from the host processor to the I/O device or vice versa without having to pass through the microprocessor and without requiring any intervention on the part of the microprocessor during such automatic transfer. Provision is made for enabling the microprocessor to perform other functions, such as the presentation of interrupts to the host processor and the servicing of additional I/O commands from the host processor concurrently with the transfer of data via the automatic bypass mechanism. This capability is particularly useful where two or more I/O devices are connected to the controller. The automatic bypass mechanism is constructed to communicate with the host processor in a cycle steal mode. A look-ahead mechanism is provided for more quickly issuing the cycle steal requests to the host processor when operating in the automatic bypass mode.

13 Claims, 13 Drawing Figures

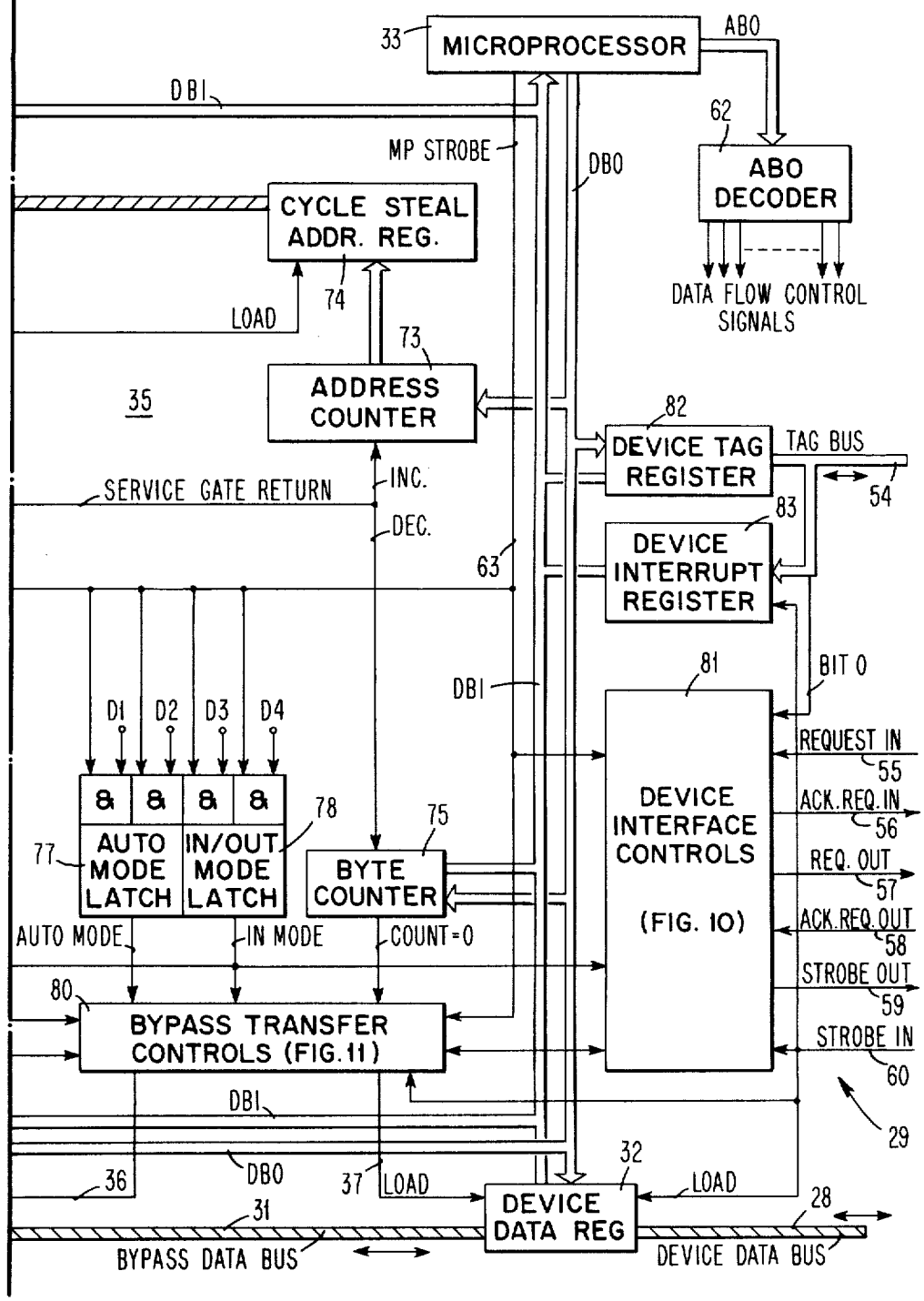

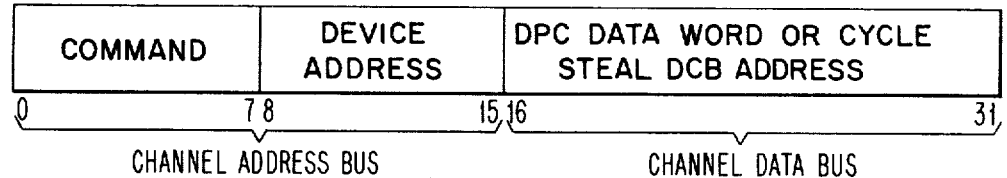
FIG. 3
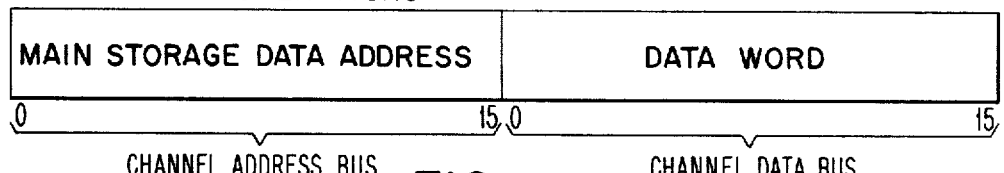
FIG. 5
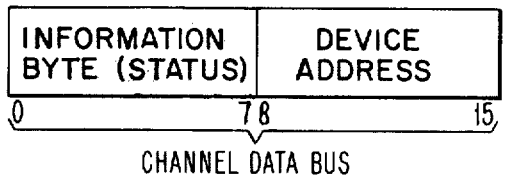
FIG. 6
FIG. 4

DATA PROCESSOR INPUT/OUTPUT CONTROLLER

DESCRIPTION

BACKGROUND OF THE INVENTION

This invention relates to input/output (I/O) controllers and microcontrollers for transferring data between a host processor and one or more peripheral input/output (I/O) devices in a digital data processing system.

It has been heretofore proposed to employ microprocessors as I/O controllers for transferring data between host processors and I/O devices. In such cases, the data is transferred from the host processor into the microprocessor and then from the microprocessor to the I/O device for an I/O device "write" operation and, conversely, from the I/O device into the microprocessor and then from the microprocessor to the host processor for an I/O device "read" operation. This is somewhat time consuming in that numerous instructions must be executed inside the microprocessor for each byte or word of data transferred. It is a purpose of the present invention, therefore, to provide a new improved automatic high-speed bypass mechanism whereby, when operating in the automatic mode, data may be transferred directly from the host processor to the I/O device, or vice versa, without having to pass through the microprocessor and without requiring any intervention on the part of the microprocessor in the absence of errors or malfunctions.

It is another purpose of the present invention to provide a new and improved I/O controller for enabling a host processor to communicate with a plurality of I/O devices in a more rapid and efficient manner. In particular, in the embodiment described herein, the controller includes mechanisms for enabling servicing of an I/O command from the host processor for one I/O device while high speed data transfers in a cycle steal mode are taking place for a second I/O device and while the microprocessor is initiating an interrupt sequence to the host processor for a third I/O device.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIGS. 2a and 2b, when placed side by side, provide a schematic block diagram showing in greater detail the construction of the novel I/O controller of FIG. 1;

FIGS. 3-6 show various command, control block and status word formats and the like used in the FIG. 1 data processing system;

DESCRIPTION OF THE ILLUSTRATED EMBODIMENT

Figure 1:
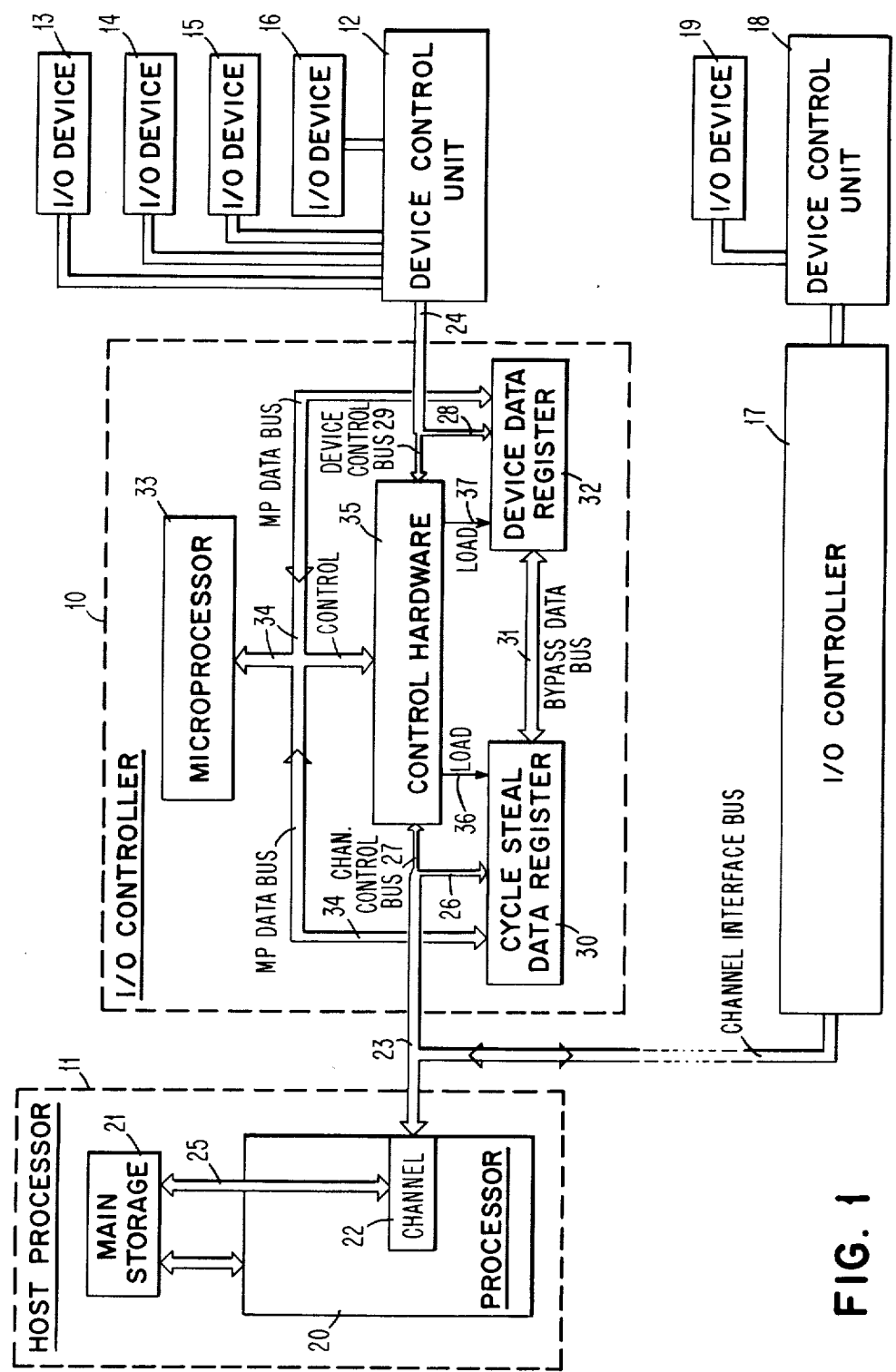
FIG. 1 is a schematic block diagram of a digital data processing system showing the incorporation therein of an I/O controller constructed in accordance with the present invention.

Referring to FIG. 1, there is shown a known and more or less representative digital data processing system showing the incorporation therein of an input/output (I/O) controller 10 constructed in accordance with the present invention. The I/O controller 10 controls the transfer of data and other information between a host processor 11 and a device control unit 12 to which are connected a plurality of peripheral I/O devices 13, 14, 15 and 16. The overall system may also include other I/O controllers, such as the I/O controller 17. Coupled to the output side of the controller 17 is a device control unit 18 followed by an I/O device 19. The I/O controller 17 may take the same form as the I/O controller 10 or it may have an entirely different form of construction.

The host processor 11 includes a processor unit 20 and a main storage unit 21. Incorporated within the processor unit 20 is an I/O channel subsystem 22 for communicating with the various I/O controllers via a channel interface bus 23. The I/O controller 10 in turn communicates with the device control unit 12 by way of a device interface bus 24. As indicated by a cycle steal storage bus 25, data and other information can be passed from the main storage unit 21 to the channel subsystem 22 or vice versa without interrupting a user program being executed by the host processor 11. This is commonly referred to as a "cycle steal" mode of operation.

For sake of example, it is assumed herein that the host processor 11 takes the form of the Series/1, Model 5 minicomputer manufactured and marketed by International Business Machines (IBM) Corporation of Armonk, New York, and described in the following references:

(1) IBM manual entitled "Series/1, Model 5, 4955 Processor Description", IBM Order No. GA 34-0021 (first edition dated November, 1976);

(2) IBM manual entitled "IBM Series/1 4955 Processor Theory", IBM Order No. SY 34-0041 (first edition dated January, 1977);

(3) U.S. Pat. No. 4,038,642, entitled "Input/Output Interface Logic For Concurrent Operations", granted to Messrs. Bouknecht et al on July 26, 1977, and assigned to International Business Machines Corporation of Armonk, New York.

The IBM manuals cited as items (1) and (2) may be obtained through any IBM branch office throughout the world. The descriptions set forth in all of these references, namely, all of items (1), (2) and (3) above, are hereby incorporated herein by this reference thereto. These references give detailed descriptions of the construction and operation of the host processor 11 and the channel interface bus 23.

It should be carefully noted that reference (3) above, namely, the U.S. patent to Bouknecht et al, describes, among other things, an I/O controller which can be thought of as being the predecessor of the I/O controller 10 shown in FIG. 1 hereof. The principal description of this predecessor controller is given in connection with FIGS. 18-21 of the Bouknecht et al patent.

As shown within the I/O controller 10, the channel interface bus 23 is comprised of a channel data bus 26 and a channel control bus 27. In a similar vein, the device interface bus 24 is comprised of a device data bus 28 and a device control bus 29. For automatic high-speed cycle steal operations, data busses 26 and 28 are interconnected by a cycle steal data register 30, a bypass data bus 31 and a device data register 32. Each of busses 26, 28 and 31 is a bidirectional bus and data may be sent in either direction on any of them. (In some implementations, bypass bus 31 may be comprised of two unidirectional busses, one for transferring data in one direction and the other for transferring data in the other direction, but this is clearly the equivalent of a single bidirectional bus.)

For non-automatic cycle steal operations, data and other information can be transferred in either direction between the host processor 11 and a microprocessor 33 located within the controller 10, such transfer being by way of the channel data bus 26, the cycle steal data register 30 and a microprocessor (MP) data bus 34. Similarly, data and other information can be transferred in either direction between the microprocessor 33 and the device control unit 12 by way of the microprocessor data bus 34, the device data register 32 and the device data bus 28.

The channel control bus 27, the device control bus 29 and the microprocessor data bus 34 each communicate with control hardware 35 located in the controller 10. In response to a start cycle steal command from the host processor 11, microprocessor 33 functions to provide various initial parameters and values to the control hardware 35. Thereafter, the control hardware 35 is capable of automatically controlling the data transfer operations without further intervention from the microprocessor 33. In other words, for the case of an automatic cycle steal operation, the microprocessor 33 provides the initial set-up of the control hardware 35, whereafter the control hardware 35 takes over and runs the actual data transfer operations. This includes the supplying of register load pulses via lines 36 and 37 to the cycle steal data register 30 and the device data register 32. A load pulse on line 36 transfers data from the device data register 32 via the bypass data bus 31 to the cycle steal data register 30, while a load pulse on line 37 transfer data in the opposite direction. The automatic control provided by control hardware 35 further includes performance of the appropriate handshaking sequences on the channel control bus 27 for transferring data between the host processor 11 and the cycle steal data register 30 and the performance of the appropriate handshaking sequences on the device control bus 29 for purposes of transferring data between the device control unit 12 and the device data register 32.

The microprocessor 33 may be, for example, of the type described in connection with FIG. 17 of the above-cited U.S. Pat. No. 4,038,642 to Bouknecht et al.

Figure 2A:
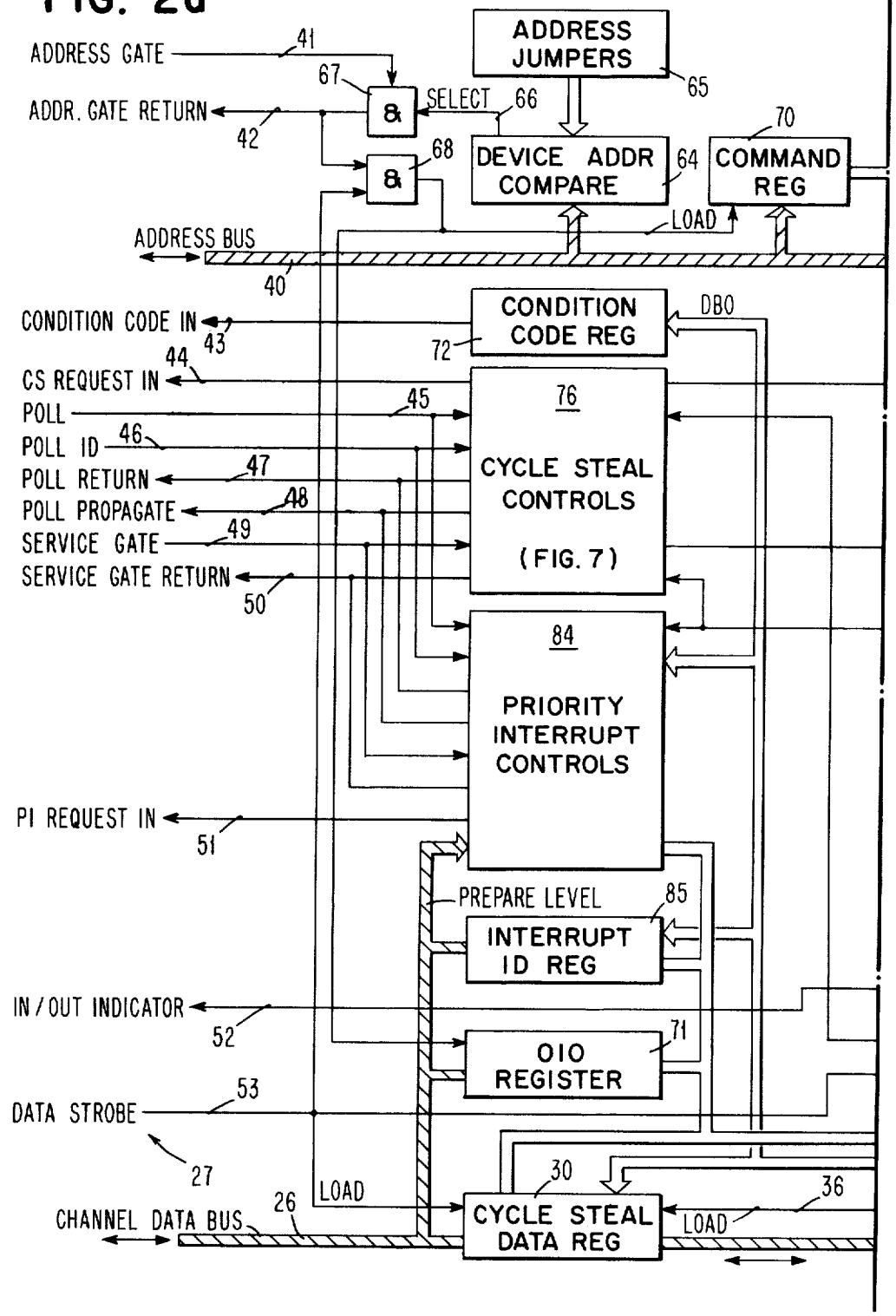

Description of FIG. 2 Controller Data Flow

Referring to FIG. 2, there is shown the principal data flow elements and data flow busses located within the I/O controller 10 of FIG. 1. The term "data" in the previous sentence is used in the broader sense of meaning any kind of information and including addresses, status words, condition codes and the like. As indicated on the left side of FIG. 2, the channel control bus 27 includes a 16-bit address bus 40 and various other busses and signaling lines 41-53. These busses and lines 40-53 and their functions are described in considerable detail in the above cited U.S. Pat. No. 4,038,642 to Bouknecht et al and such descriptions will not be repeated in detail herein. As indicated on the right side of FIG. 2, the device control bus 29 includes an 8-bit device tag bus 54 as well as various signaling lines 55-60.

For the embodiment described herein, a "byte" is comprised of eight bits and a "word" is comprised of two bytes (sixteen bits).

The microprocessor 33 is assumed to include therein a random access storage unit having a storage capacity of 4096 bytes or more. The microprocessor data bus 34 includes two separate unidirectional busses, namely, a Data Bus In (DBI) for bringing data and other information into the microprocessor 33 and a Data Bus Out (DBO) for outputting data and other information stored in the microprocessor 33. The microprocessor 33 also includes an Address Bus Out (ABO) for supplying external "addresses" to an ABO decoder 62. Sometimes the "address" on the ABO bus will identify a particular register in the controller which is to send data to or receive data from the microprocessor 33. At other times, the "address" on the ABO bus will identify particular functions to be performed by the FIG. 2 controller. In any event, the "address" on the ABO bus is decoded by the decoder 62 to develop the particular control signal or signals which are need to accomplish the desired purpose. Some of these control signals will be used to load particular registers, while others will be used to enable different combinations of the various control gates (not shown) associated with the various data flow busses and lines of the FIG. 2 controller.

For simplicity, the connections for the control lines from decoder 62 are mostly not shown in FIG. 2. For sake of example herein, each of the DBI, DBO and ABO busses is assumed to be an eight-bit bus. The microprocessor 33 also has a control strobe output line 63 which is used to provide strobe signals to various elements in the FIG. 2 controller.

As is customary with microprocessors, the microprocessor 33 is a stored program machine and has stored therein the appropriate program for use in connection with the FIG. 2 controller. This program includes the various routines needed to perform the various functions and operations either required or desired to be performed within the FIG. 2 controller. Some of these routines will be mentioned at various points hereinafter.

There will now be considered the method by which the host processor 11 establishes a connection with and carries on communications with the I/O controller 10. In general, the host processor 11 tells the I/O controller 10 what to do by issuing I/O commands to the controller 10. For the assumed case where the host processor 11 is of the type described in the above-cited U.S. Pat. No. 4,038,642 to Bouknecht et al, there are two basic classes of I/O commands. One class is known as Direct Program Control (DPC) commands. Each such command is capable of transferring one word (two bytes) of data from the host processor 11 to the I/O controller 10 or vice versa. In other words, a new command is issued for each word that is transferred. Since each command is issued as a result of a separate instruction in the host processor program, each word transfer is under the direct control of the host processor program.

The other class of I/O commands provided by the host processor 11 will be referred to herein as cycle steal commands. Each cycle steal data transfer command is capable of causing the transfer of a relatively large number of data words, with each word transfer being done in a cycle steal mode such that the host processor program is not interrupted. In other words, one program instruction is used to issue a cycle steal start command and thereafter the I/O controller 10 causes the transfer of a specified number of bytes without need for any further program instructions or I/O commands.

The host processor program instruction used to cause the issuance of an I/O command is herein referred to as an Operate I/O (OIO) instruction. Execution of an OIO instruction causes a two-word block of information, referred to as an Immediate Device Control Block (IDCB), to be fetched from the main storage 21 and sent to the I/O controller 10 via the channel interface bus 23. The format of this IDCB is shown in FIG. 3. As there indicated, the first word is sent out over the channel address bus 40 and such word contains the I/O command code and I/O device address. The second word is sent out over the channel data bus 26 and, for a DPC write operation, comprises the word of data which is to be written onto the I/O device. For a DPC read operation, the word on the channel data bus 26 is the word read from the I/O device and being sent to the host processor 11. For the case of a cycle steal type command, the second word of the IDCB contains the starting address in the main storage 21 of a Device Control Block (DCB). For the case of either a DPC write command or a cycle steal command, both words of the IDCB are transferred to the I/O controller 10 at one and the same time, the first word being transferred by way of the channel address bus 40 and the second word being transferred by way of the channel data bus 26.

Each IDCB word is transferred to an I/O controller by means of an initial selection sequence by means of which the host processor 11 selects the particular I/O controller to which the IDCB is sent. As an initial step, host processor 11 places the first word of the IDCB on the address bus 40. This sends the device address out to all of the I/O controllers and other units which are attached to the channel interface bus 23. For the I/O controller 10, this device address is looked at by a device address compare circuit 64, which compares it with the acceptable device addresses which are provided by address jumpers 65. Since, in the present example, the I/O controller 10 is used for communicating with up to four different I/O devices, address jumpers 65 supply address bits for recognizing up to four different but contiguous device addresses having the same higher order address bits to the address compare circuit 64. If there is a match with any one of these four contiguous device addresses, then the address compare circuit 64 activates a controller select line 66.

Shortly after the host processor 11 places the command and device address on the address bus 40, it activates Address Gate line 41. Assuming that the controller select line 66 is activated, this causes AND circuit 67 to activate the Address Gate Return line 42 to tell the host processor 11 that an address match has been established. In response thereto, the host processor 11 sends out a data strobe pulse on the Data Strobe line 53. Since the Address Gate Return line 42 is active, this data strobe pulse is passed by AND circuit 68 to a command register 70 to cause the command code, which is also on the address bus 40, to be loaded into the command register 70. This data strobe pulse from AND circuit 68 is also supplied to an OIO register 71 to cause the second word of the IDCB (on channel data bus 26) to be loaded into such OIO register 71.

During this initial selection sequence, the host processor 11 also checks the status of the controller 10 by looking at the condition code present on the three-bit Condition Code In bus 43. This condition code is provided by the controller condition code register 72. The contents of register 72 reflect the current status for the controller 10.

After completion of the foregoing steps, the host processor 11 deactivates the Address Gate line 41 which, in turn, causes the AND circuit 67 to deactivate the Address Gate Return line 42. This concludes the initial selection sequence. Shortly thereafter, the command in command register 70 and the data word or DCB address in OIO register 71 are transferred to the microprocessor 33 via the Data Bus In (DBI) bus. The microprocessor 33 examines the command and, depending on the current status of the controller 10, decides what to do next. More accurately, depending on the particular command code and the current status, the program in the microprocessor 33 branches to the appropriate routine or subroutine for accomplishing the next step.

Assume, for example, that none of the I/O devices 13–16 are busy and that the command is a DPC Write command. In this case, the program in microprocessor 33 branches to a routine which causes the data word received from the OIO register 71 to be loaded into the device data register 32 via the DBO bus. This routine also invokes the appropriate signalling or handshaking sequence with the device control unit 12 to cause the data word in the device data register 32 to be transferred to such device control unit 12. The device control unit 12 will thereafter transfer this data word to the proper one of I/O devices 13–16 in the proper format required by such I/O device.

Now consider the case where the command received from the host processor 11 and set into the command register 70 is a Start cycle steal command. In this case, the Start cycle steal command in command register 70 and the DCB address in OIO register 71 are transferred to microprocessor 33 via the DBI bus. Assume, for the moment, that the controller 10 is not busy with other tasks and that none of the I/O devices 13–16 are busy. In this case, the program in microprocessor 33 branches to a routine for fetching the Device Control Block (DCB) from the host processor 11 and storing it into the storage unit inside the microprocessor 33.

The format of this device control block is shown in FIG. 4. This device control block contains all the information necessary for enabling the controller 10 to control and carry out the desired cycle steal data transfer operation. It is comprised of eight 16-bit words. Word 6, for example, specifies the number of bytes of data to be transferred up to a maximum of 65,536 bytes. An even larger number of bytes can be transferred without interrupting the host processor 11 by chaining to another DCB after the byte count in Word 6 is exhausted, the starting address of the next DCB being contained in Word 5 of the first DCB.

The starting address in the host processor main storage 21 for the data to be transferred is specified in Word 7 of the DCB. For an output (device write) operation, this is the starting address for the data to be taken from the main storage 21. For an input (device read) operation, this is the starting address for the data being read from the I/O device and transferred to the main storage 21. One of the bits in the DCB control word (DCB Word 0) tells whether the operation is an input (device read) operation or an output (device write) operation. Another of the bits in the DCB control word tells whether or not there is to be chaining to a next DCB when the byte count in the current DCB is exhausted. Further details of the device control block shown in FIG. 4 are described in the above-cited references and need not be considered herein.

The controller 10 fetches the DCB words from the host processor 11 by cycle stealing them one word at a time from the host processor 11. In particular, the microprocessor 33 sets the DCB address obtained from OIO register 71 into an address counter 73. This address is then transferred to a cycle steal address register 74, the output side of which is connected to the host processor address bus 40. Since the DCB contains eight words (16 bytes), the microprocessor 33 sets a count of 16 into a byte counter 75. The microprocessor 33 then causes cycle steal controls 76 to activate a Cycle Steal (CS) Request In line 44 to the host processor 11. This is accomplished by sending to the cycle steal controls 76 the microprocessor (MP) control strobe via line 63 and the appropriate decoder output signal from the ABO decoder 62.

In response to the Cycle Steal Request In signal, the host processor 11 initiates polling and service gate sequences during the latter of which the cycle steal address on address bus 40 is used to fetch DCB Word 0 from the main storage 21 and such word is transferred to the cycle steal data register 30 via the channel data bus 26. The actual loading of the data word into the cycle steal data register 30 is accomplished by the data strobe pulse sent out on Data Strobe line 53 during the service gate handshaking sequence. These polling and service gate sequences will be discussed in greater detail hereinafter. In should be noted, however, that during the service gate sequence the address counter 73 is incremented by a count of two and the byte counter 75 is decremented by a count of two to prepare the controller 10 for the next cycle steal request in signal. Following completion of the service gate sequence, the new address in address counter 73 is set into the cycle steal address register 74 to prepare same for the next cycle steal request in.

The DCB word residing in the cycle steal data register 30 at this point, namely, Word 0, is then transferred to the microprocessor 33 via the DBI bus. After storage of the DCB Word 0 into its storage unit, microprocessor 33 causes the cycle steal controls 76 to issue a new cycle steal request in by again activating the CS Request In line 44. This causes DCB Word 1 to be fetched from the main storage 21, sent out over the channel data bus 26 and loaded into the cycle steal data register 30. Address counter 73 is again incremented by two and byte counter 75 is again decremented by two, the new address thereafter being transferred to the cycle steal address register 74. DCB Word 1 is then transferred from the cycle steal data register 30 via the DBI bus and stored into the storage unit in microprocessor 33. Thereafter, microprocessor 33 causes the cycle steal controls 76 to issue a new cycle steal request in on line 44. The foregoing steps are then repeated to transfer DCB Word 2 from the host processor main storage 21 to the storage unit in the microprocessor 33. This process continues until the count in byte counter 75 reaches a value of zero. In this manner, all eight DCB words are set into the storage unit in the microprocessor 33.

Following completion of the foregoing DCB fetching operation, the microprocessor 33 sets up the controller 10 to perform the desired automatic transfer of data from the host processor 11 to the device control unit 12, or vice versa, via the bypass data bus 31. With respect to the host processor 11, these data transfers are performed in the cycle steal mode with the assistance of the cycle steal controls 76. As part of the initial set-up for the automatic transfer, the microprocessor or 33 places an auto mode latch 77 in a set condition. This is accomplished by the microprocessor (MP) strobe on line 63 and the appropriate decode signal D1 from the ABO decoder 62. (When appropriate, the auto mode latch 77 is reset by the MP strobe and a decode signal D2 from the ABO decoder 62.) The set condition of auto mode latch 77 (Auto Mode output =1) signifies that automatic data transfer operations are in progress in the controller 10.

As a further initial step, the microprocessor 33 places an In/Out mode latch 78 in a set condition if input (device read) operations are to be performed or in a reset condition if output (device write) operations are to be performed. The MP strobe and the D3 decoder signal are used to set the latch 78, while the MP strobe and the D4 decoder signal are used to reset the latch 78. The output of latch 78 is used for logic purposes in various other of the unit in the controller 10. It also provides the In/Out indicator on the control line 52 which runs to the host processor 11. The state to which the latch 78 is placed is determined by the input/output indicator bit in the DCB control word stored in the microprocessor 33.

As further initial auto mode setup steps, the microprocessor 33 sets into the address counter 73 the main storage data address contained in Word 7 of the device control block and sets into the byte counter 75 the byte count contained in Word 6 of the device control block.

After completion of the initial auto mode set-up steps, the hardware portion of controller 10 commences the automatic transfer of data via the bypass data bus 31. A key element in the bypass transfer operations is the bypass transfer controls 80. For an output transfer, the bypass transfer controls 80 supply a load pulse via line 37 to the device data register 32 when it is desired to transfer data from the cycle steal data register 30 to the device data register 32. For an input transfer, the bypass transfer controls 80 supply a load pulse via line 36 to the cycle steal data register 30 when it is desired to transfer data from the device data register 32 to the cycle steal data register 30.

In the present embodiment, it is assumed that the device data register 32 is a 16-bit register and that the by-pass data bus 31 is a 16-bit bus and that each transfer passes one data word from the cycle steal data register 30 to the device data register 32 or vice versa. It is to be understood, however, that in some implementations the device data register 32 may be an 8-bit register and the bypass data bus 31 may be an 8-bit bus. In such case, each transfer on the bypass bus 31 will pass one data byte from the cycle steal data register 30 to the device data register 32 or vice versa. Nevertheless, the channel data bus 26 will continue to be a 16-bit bus and the cycle steal data register 30 will continue to be a 16-bit register. Thus, two one-byte transfers will be required on the 8-bit bypass bus to load or unload, as the case may be, the cycle steal data register 30. In such case there will be two bypass data bus transfers for each channel data bus transfer. For simplicity of explanation, only the initially assumed case of a 16-bit bypass data bus 31 and a 16-bit device data register 32 will be considered in detail herein.

The general procedure for automatic mode input data transfer operations will now be described. For each one word transfer, the device control unit 12 will activate the request in line 55, which comes into device interface controls 81. This signifies that the control unit 12 is ready to send data. If the device data register 32 is empty, interface controls 81 will respond by activating the acknowledge request in line 56. In response thereto, the control unit 12 sends in a strobe in pulse on control line 60. This strobe in pulse is sent to the device data register 32 to load therein the data appearing on the device data bus 28. This strobe in pulse is also sent to the bypass transfer controls 80 to tell it that the device data register 32 now has a word of data in it.

If the cycle steal data register 30 is empty, then the bypass transfer controls 80 sends a load pulse thereto via line 36. This transfers the data word in device data register 32 to the cycle steal data register 30. At this point, the cycle steal data register 30 is "full" and the device data register 32 is "empty". The bypass transfer controls 80 makes a note of both of these facts in a pair of register status indicator latches located therein.

Shortly prior to the loading of the data into the cycle steal data register 30, the bypass transfer controls 80 tells the cycle steal controls 76 to activate the cycle steal request in line 44 running to the host processor 11. Such cycle steal request in signal initiates a signalling sequence which causes the host processor 11 to take in the data word then resident in the cycle steal data register 30. During the course of this transfer to the host processor 11, the host processor 11 tells the cycle steal controls 76 to turn off its cycle steal request in line. Near the end of this process, the host processor 11 tells the cycle steal controls 76 to tell the bypass transfer controls 80 that the cycle steal data register 30 has been emptied.

The foregoing steps are repeated each time another word of data is transferred from the device control unit 12 to the host processor 11. These steps continue to be repeated until the byte counter 75 goes to zero. In this regard, each time a data word is transferred from the cycle steal data register 30 to the host processor 11, the address counter 73 is incremented by two and the byte counter 75 is decremented by two. When the byte counter 75 goes to zero, this zero condition is detected by the microprocessor 33, which then performs the appropriate ending sequence routine.

The general sequence of events for automatic mode output type data transfer operations will now be considered. Each one-word output transfer is initiated by the controller 10 by activating the cycle steal request in line 44. More particularly, when the cycle steal data register 30 is empty, the bypass transfer controls 80 tells the cycle steal controls 76 to activate the cycle steal request in line 44. In response thereto, the host processor 11 fetches from main storage 21 the data word, the first byte of which is indicated by the cycle steal address appearing on the address bus 40. Thereafter, host processor 11 places this data word on the channel data bus 26 and sends out a data strobe pulse on the data strobe line 53. This loads the data word on the channel data bus 26 into the cycle steal data register 30. The data strobe on line 53 is also supplied to the bypass transfer controls 80 to tell it that the cycle steal data register 30 is now full.

If the device data register 32 is empty or subsequently becomes empty, the bypass transfer controls 80 supplies a load pulse thereto via the line 37. This transfers the data word in cycle steal data register 30 to the device data register 32. At this point, the bypass transfer controls 80 makes a note of the facts that the device data register 32 is now full and that the cycle steal data register 30 is now empty. The later fact, namely, that the cycle steal data register 30 is empty, is conveyed back to the cycle steal controls 76 so that such controls can issue a new cycle steal request in signal.

Looking in the device direction, the fact that the device data register 32 is now full is conveyed by the bypass transfer controls 80 to the device interface controls 81 so that it can respond to the device control unit 12 when such control unit 12 indicates that it is ready to receive data. More particularly, when the device control unit is ready to receive data, it activates the request in line 55 to the device interface controls 81. If the device data register 32 is full, or whenever it thereafter becomes full, the interface controls 81 activate the acknowledge request in line 56 running to the device control unit 12. Shortly thereafter, the interface controls 81 send a strobe out pulse to the device control unit 12 via the strobe out line 59. This strobe out pulse causes the device control unit 12 to take in the data word then residing in the device data register 32 and appearing on the device data bus 28. At this point, the interface controls 81 tell the bypass transfer controls 80 that the device data register 32 is now empty. This enables the bypass transfer controls 80 to issue a new load pulse to the device data register 32 via line 37 as soon as the cycle steal data register 30 again becomes full.

The foregoing automatic output mode steps are performed each time a word of data is transferred from the host processor 11 to the device control unit 12. This process continues until the count in byte counter 75 goes to zero. In this regard, each time a new data word is loaded into the cycle steal data register 30, the address counter 73 is incremented by two and the byte counter 75 is decremented by two. Shortly after the byte counter 75 goes to zero, the microprocessor 33 detects such occurrence and performs the appropriate ending sequence routine.

A device tag register 82 is used in connection with the device tag bus 54 for purposes of sending control type information to the device control unit 12. Such information is obtained from the microprocessor 33 via the DBO bus. Conversely, the tag register 82 is also used for receiving control information from the device control unit 12. Such control information is then conveyed to the microprocessor 33 by way of the DBI bus.

A device interrupt register 83 is also connected to the tag bus 54 and is used to tell the microprocessor 33 that one or more particular I/O devices want to interrupt the microprocessor 33 and send it a message. The interrupt register 83 contains a separate bit position for each one of the four I/O devices 13–16. Bit position 0 is turned on when I/O device 13 has an interrupt pending, bit position 1 is turned on when I/O device 14 has an interrupt pending, and so forth. If the tag bits supplied to the interrupt register 83 are coded, as opposed to being bit significant, then the interrupt register 83 includes at the input thereof a decoder for determining which of the four register bit positions is to be turned on for any given interrupt code value on the tag bus 54. The supervisor program routine in the microprocessor 33 periodically senses the contents of the interrupt register 83 to determine which, if any, I/O devices have posted an interrupt.

After all the data has been transferred for any given Direct Program Control (DPC) command or cycle steal data transfer command, the I/O controller 10 performs an ending sequence to advise the host processor 11 of such fact. In the present embodiment, this ending sequence takes the form of a priority interrupt sequence and is performed by means of priority interrupt controls 84 and an interrupt ID register 85. As a preliminary step in this priority interrupt routine, the microprocessor 33 loads an interrupt ID word into the interrupt ID register 85. The format of this interrupt ID word is shown in FIG. 6. The first byte thereof is an information byte containing various status information. The second byte of the interrupt ID word contains the device address of the particular I/O device for which the interrupt is being performed. As a further preliminary step, the microprocessor 33 loads the appropriate condition code into the condition code register 72. For a normal ending, the condition reported will be "Device End".

The priority interrupt handshaking sequence is initiated by the priority interrupt controls 84 upon receipt by such controls of the MP strobe from the microprocessor 33 and the appropriate decode signal from the ABO decoder 64. In response thereto, the priority interrupt controls 84 energizes one of the plurality of lines in the Priority Interrupt (PI) request in bus 51. This bus 51 includes as many lines as there are priority levels. The lines are bit significant, with each line being used to signal a priority level. A single priority level is assigned to the controller 10, even though multiple I/O devices are serviced by the controller 10. A coded indication of the priority level is contained in a priority level register or prepare level register located within the priority interrupt controls 84. This priority level register is loaded from the channel data bus 26 during the issuance of a prepare command by the host processor 11, such command being of the DPC type. In this manner, the host processor 11 assigns the interrupt priority level to the I/O controller 10.

In due course, the host processor 11 responds to the activated priority interrupt request in line of bus 51 by sending out a poll ID to the controller 10 via the poll ID bus 46. The poll ID bus 46 is a five-bit bus and the coding of the five bits thereon identifies the particular priority level which is being recognized. This priority level is compared within the priority interrupt controls 84 with the code in the priority level register located therein. If a priority level match is detected, the priority level controls 84 activate the poll return line 47. In response thereto, the host processor 11 sends out a service gate signal to the controller 10 on the service gate line 49. Upon receipt of this signal, the priority interrupt controls 84 send out a service gate return signal on the service gate return line 50. At the same time, the contents of the interrupt ID register 85 are placed on the channel data bus 26 and the contents of the condition code register 72 are placed on the condition code in bus 43. The service gate return signal tells the host processor 11 that the desired information is available on the channel data bus 26 and the condition code in bus 43. Shortly thereafter, the host processor 11 takes in this information and stores it in the appropriate registers therein. After this is completed, the host processor 11 deactivates the service gate line 49 to cause termination of the interrupt handshaking sequence.

The host processor 11 uses the information contained in interrupt ID word and the condition code as a basis for determining which I/O program routine should be next performed. If, for example, the condition code indicates a normal device ending and no other interrupts are pending, then the host processor 11 may precede to issue the next OIO instruction for the particular I/O device which presented the just received interrupt information. If, on the other hand, the condition code and the status byte in the interrupt ID word should indicate a problem condition, the host processor 11 I/O supervisor program will, in due course, branch to the appropriate routine for servicing the problem condition.

The priority interrupt controls 84 are generally similar to the priority interrupt controls described in the above cited U.S. Pat. No. 4,038,642 to Bouknecht et al. Consequently, a detailed description of their construction will not be given herein.

Figure 7:
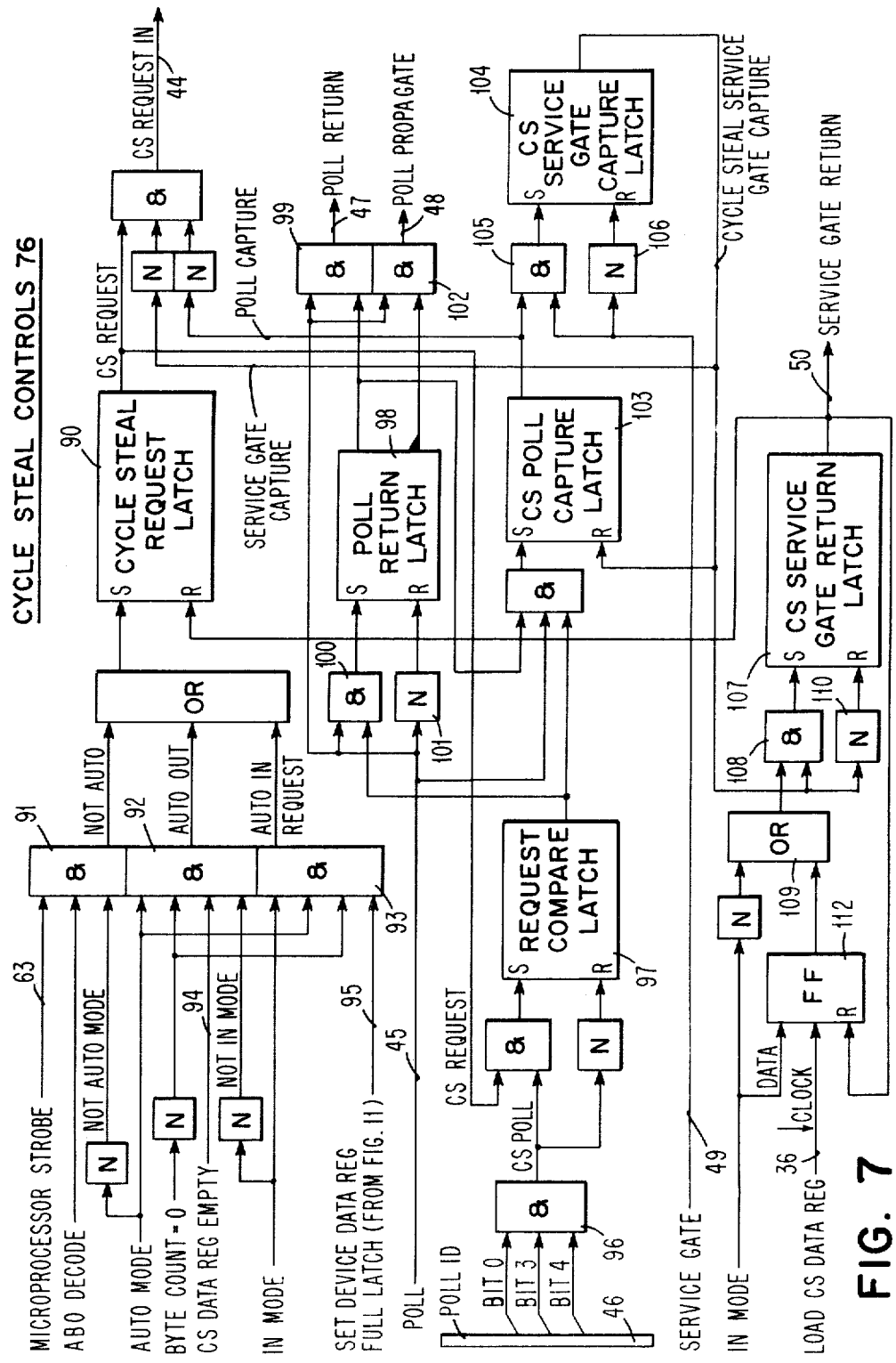
FIG. 7 is a logic circuit diagram showing in detail the internal construction of the cycle steal controls of FIG. 2.

FIG. 7 Cycle Steal Controls

Referring to FIG. 7, there is shown the internal construction of the cycle steal controls 76 of FIG. 2. The "auto mode" input in FIG. 7 is obtained from the auto mode latch 77 of FIG. 2. The "in mode" input of FIG. 7 is obtained from the In/Out mode latch 78 of FIG. 2. The "byte count=0" input of FIG. 7 is obtained from the byte counter 75 of FIG. 2.

The first item to note in FIG. 7 is the cycle steal request latch 90. The placing of this latch 90 in a set condition activates the cycle steal request in line 44 running to the host processor 11, provided neither a poll capture signal nor a service gate capture signal are at their active levels. The various conditions that can cause the cycle steal request latch 90 to be set are represented by the inputs to AND circuits 91, 92 and 93. The output of AND circuit 91 goes to the "latch set" level when the controller 10 is not in the auto mode, the microprocessor (MP) strobe is present and the appropriate ABO decoder 62 output line is activated. This mechanism enables the microprocessor 33 to set the cycle steal request latch 90.

The output of AND circuit 92 goes to the "set" level when operating in an automatic output (device write) mode when the cycle steal data register 30 is in an empty condition, provided the byte count is not zero. The CS data register empty line 94 comes from the bypass transfer controls 80, which are shown in greater detail in FIG. 11.

The output of AND circuit 93 goes to the "set" level during an automatic input (device read) operation at that point in time when the device data register 32 is loaded with a data word from an I/O device, provided the byte count in counter 75 is not zero. As will be discussed further hereinafter, this initiating of the CS request in signal on line 44 before the data word is transferred to the cycle steal data register 30 provides a desirable lookahead action which increases the data transfer rate. As indicated in FIG. 7, the output of AND circuit 93 goes to the "set" level upon occurrence of a "set device data register full latch" pulse on line 95. This pulse is obtained from the bypass transfer controls 80, which are shown in greater detail in FIG. 11.

The next item to be considered is an AND circuit 96 which is used to decode the bit code on the poll ID bus 46 to produce a binary one-level output when the cycle steal ID code is detected. In the present example, it is assumed that the cycle steal ID code is "1XX11", where the X's denote "don't care" bits. The detection of the cycle steal poll ID by AND circuit 96 causes a request compare latch 97 to be set, provided that a cycle steal request is in fact pending for the controller 10. The set condition of latch 97 indicates that an ID match has been obtained.

A "match" (binary one level) output from latch 97, together with the presence of a poll signal on poll line 45, causes the generation of a poll return signal on poll return line 47. This is accomplished by means of poll return latch 98 and AND circuit 99. The two signals just mentioned serve to set the poll return latch 98 via an AND circuit 100. The set condition of latch 98, together with the poll signal on line 45, causes AND circuit 99 to activate (place at binary one level) the poll return line 47. Termination of the poll signal on line 45 resets the poll return latch 98 via NOT circuit 101. This causes termination of the poll return signal on poll return line 47.

If a poll ID match is not obtained, then the poll return latch 98 is not set and the poll signal on line 45 causes activation of a poll propogate line 48 via AND circuit 102. As discussed in the above cited references, this, in effect, causes the poll signal to be passed on to the next I/O controller on the channel interface bus to see if such next controller was the one that issued the cycle steal request in.

The poll ID "match" level at the output of latch 97 also serves to set a cycle steal poll capture latch 103, provided the poll signal is present on line 45 and provided that the poll return latch 98 has been set. The set condition of poll capture latch 103 indicates that the poll sequence initiated by the host processor 11 has been captured by the I/O controller 10.

The next item to note is a cycle steal service gate capture latch 104. This latch 104 is set by the occurrence of the service gate signal on service gate line 49 via AND circuit 105, provided that the poll capture latch 103 is already set. The set condition of latch 104 indicates that the service gate issued by the host processor 11 has been captured by the controller 10. Among other things, such service gate capture condition will be used in the generation of the service gate return signal sent back to the host processor 11. Latch 104 is reset via NOT circuit 106 when the service gate line 49 is deactivated by the host processor 11.

The service gate return signal on line 50 is produced when a cycle steal service gate return latch 107 is in a set condition. When the controller 10 is operating in an output (device write) mode, the service gate return latch 107 is immediately set via AND circuit 108 by the setting of the service gate capture latch 104. In this output mode, the second input to AND circuit 108 is always at the binary one level because the In Mode signal is zero, thus producing a binary one level at the output of OR circuit 109. The service gate return latch 107 is reset via NOT circuit 110 following the resetting of the service gate capture latch 104, this latter event being caused by the discontinuance of the service gate signal on line 49.

When the controller 10 is operating in an input (device read) mode, a special mechanism is provided to delay, when necessary, the setting of the service gate return latch 107. This mechanism includes an edge triggered flip flop circuit 112 which is flipped to the binary level present on its data input upon occurrence of a negative-going pulse edge at its clock input. Since the controller 10 is operating in the input mode, the In Mode line, and hence the data input of the flip flop 112, is at the binary one level. The clock input of flip flop 112 is connected to the load cycle steal data register line 36, which, as indicated in FIG. 2, runs from the bypass transfer controls 80 to the cycle steal data register 30. Since the load CS data register pulse is a positive-going pulse, the trailing edge of this pulse is effective to clock the flip flop 112 to the binary one condition or "set" condition. This set condition is effective via OR circuit 109 and AND circuit 108 to set the service gate return latch 107 since the latch 104 was previously set by the service gate signal on line 49.

Thus, for input operations, the trailing edge of the load cycle steal data register pulse determines the moment of activation of the service gate return line 50. Since the host processor 11 will not accept the data appearing on the channel data bus 26 until it receives the service gate return signal from the controller 10, this means that the host processor 11 will not read the data on the channel data bus 26 until the loading of the cycle steal data register 30 has been completed. This precaution is needed because, as previously mentioned in connection with the AND circuit 93, the cycle steal request in signal is sent to the host processor 11 before the data word is transferred to the cycle steal data register 30. Without this precaution, the host processor 11 might read erroneous data if the data word is somewhat late in getting into the cycle steal data register 30.

Figure 8:
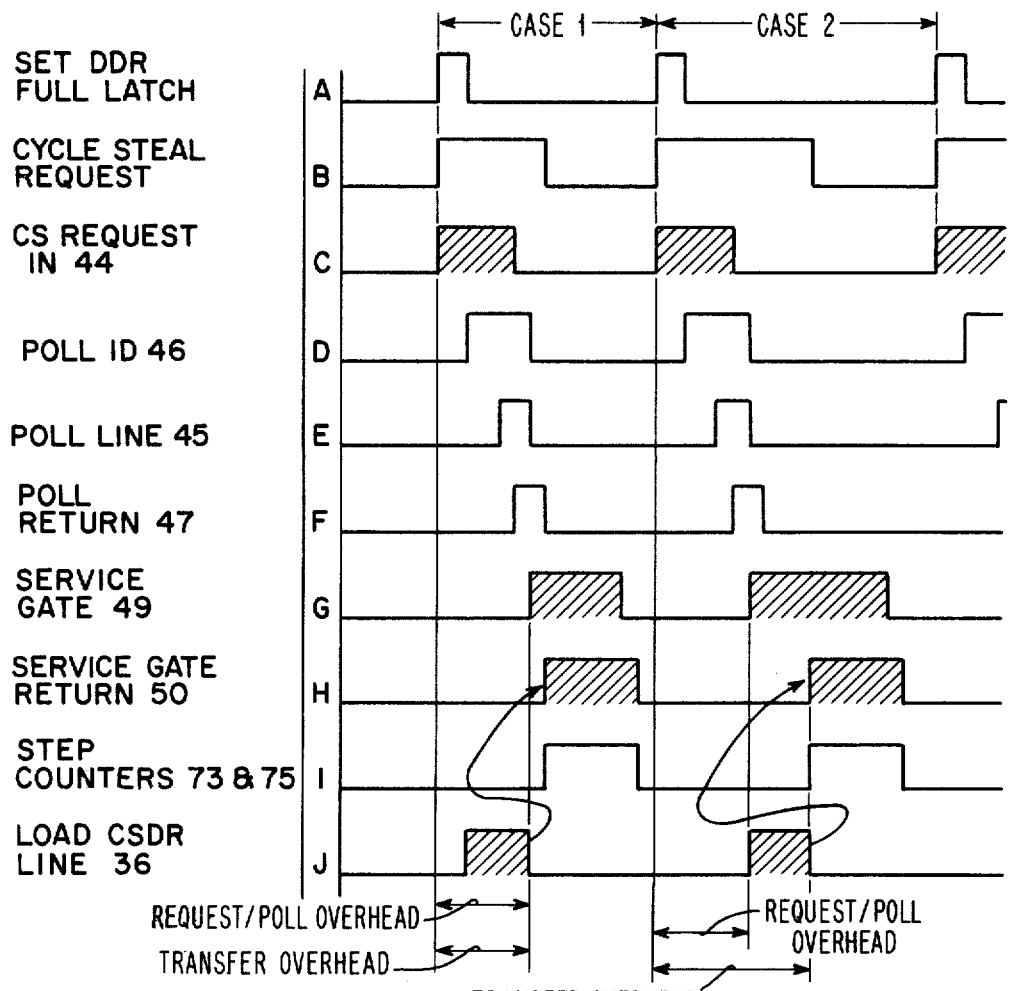
FIG. 8 is a timing diagram used in explaining the operation of the FIG. 7 cycle steal controls.

The timing diagram of FIG. 8 illustrates the foregoing relationships for the case of automatic cycle steal input mode data transfer operations. Waveform C shows the cycle steal request in signals sent to the host processor 11 via CS request in line 44. Waveform J shows the load CSDR pulses on the line 36, which are used to load the data word into the cycle steal data register 30 from the device data register 32. Case 1 illustrates the case where the cycle steal data register 30 is loaded fairly promptly and the service gate return signal (waveform H) is issued in its normal manner after the occurrence of the service gate signal (waveform G). Case 2 illustrates the case where the loading of the cycle steal data register 30 is behind schedule relative to the occurrence of the service gate signal. In this case, the delay provided by flip flop circuit 112 prevents issuance of the service gate return signal until the loading and settling of the new data into the cycle steal data register 30 has been completed.

FIG. 8 also illustrates the advantage of the lookahead mechanism which enables the CS request in to be issued before the cycle steal data register 30 is loaded. In both cases, the data transfer overhead (the time required to move the data from device data register 32 to cycle steal data register 30) is overlapped with the cycle steal request/poll sequence overhead (the time required to issue the cycle steal request and to perform the polling sequence). This is in contrast to the previous practice followed for I/O controllers wherein the cycle steal request in signal is not issued until after completion of the loading of the data register connected to the channel data bus. In contrast thereto, the lookahead mechanism of the present embodiment enables a time saving for each data word transferred, which time saving is equal to the request/poll overhead time. This time overlap, though relatively small and perhaps insignificant to slow speed types of I/O devices, is very significant for the case of high speed I/O devices capable of operating in the 300 to 400 kiloword per second range.

Figure 9:
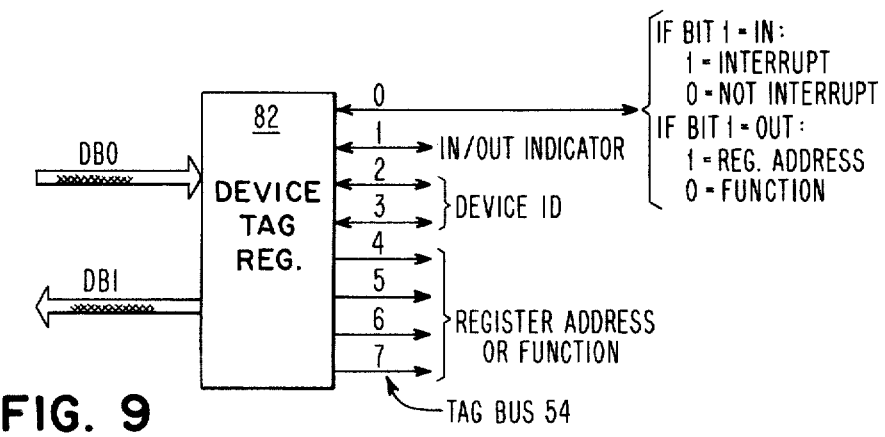
FIG. 9 shows in greater detail the nature of the device tag bus of FIG. 2.

FIG. 9 Description of Device Tag Bus

Referring to FIG. 9, there is shown in greater detail the tag bus 54 of FIG. 2, which is used for enabling the microprocessor 33 in the controller 10 to communicate with the device control unit 12 and vice versa. As indicated in FIG. 9, tag bus lines 0-3 are used in a bidirectional manner and tag bus lines 4-7 are used in a unidirectional manner. Tag lines 2 and 3 are used to transfer a two-bit binary code to identify the particular I/O device to which or for which the communicating is being done. Thus, for example, device ID code "00" may be assigned to I/O device 13, device ID code "01" to I/O device 14, and so forth. Tag lines 4-7 are used to supply to the device control unit 12 a 4-bit binary code identifying either a particular register in the device control unit 12, to which or from which information is to be transferred, or to identify a particular function to be performed within the device control unit 12. As such, tag lines 4-7 are analogous to the ABO bus of the microprocessor 33.

Tag line 1 is an input/output indicator line for indicating whether information is to be transferred from the device control unit 12 to the controller 10, or vice veras. For a transfer in to the controller 10 (Bit 1=In), tag line 0 indicates whether the transfer is an interrupt transfer (Bit 0=1) or whether it is a read/write data transfer (Bit 0=0). If, on the other hand, the transfer is a transfer out to the device control unit 12 (Bit 1=Out), then tag line 0 indicates whether tag lines 4-7 represent a register address (Bit 0=1) or a function ID (Bit 0=0).

Figure 10:
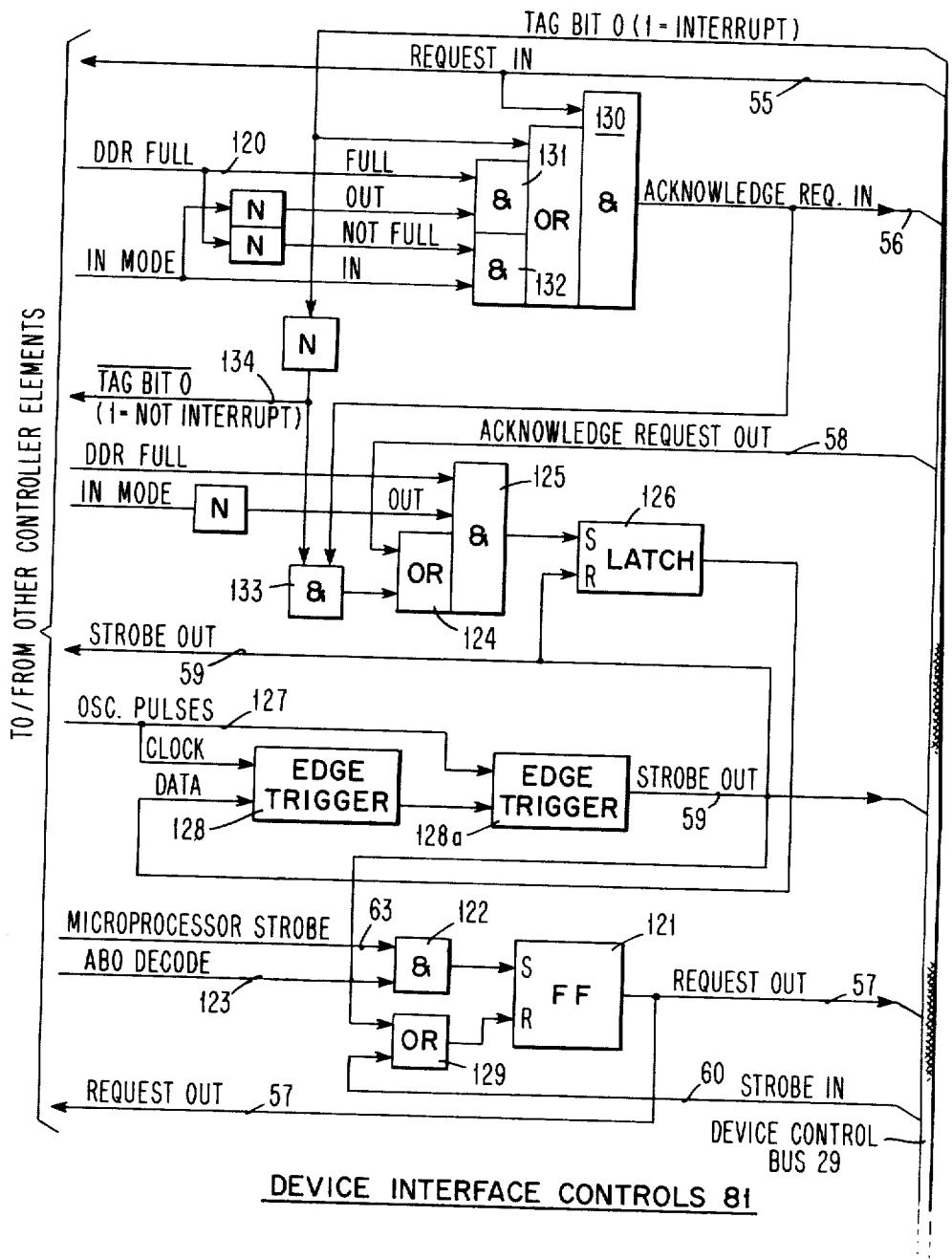
FIG. 10 is a logic circuit diagram showing in detail the internal construction of the device interface controls of FIG. 2.

FIG. 10 Device Interface Controls

Referring to FIG. 10, there is shown in detail the internal construction of the device interface controls 81 of FIG. 2. Initial communication with a particular I/O device is established by means of a request out sequence. As a preliminary matter, the microprocessor 33 loads the device tag register 82 with the appropriate control information and, where appropriate, also loads the device data register 32 with data or other information. Microprocessor 33 also tells the bypass transfer controls 80 to turn on a device data register (DDR) full line 120 which, among other things, runs to the device interface controls 81. Microprocessor 33 then turns on a request out flip flop 121 (FIG. 10) via AND circuit 122 by means of the microprocessor (MP) strobe on line 63 and the appropriate ABO decode signal on line 123, such line being connected to the output of the ABO decoder 62. Microprocessor 33 also sets the controller in/out mode latch 78 to the not in mode (out) condition (In Mode=0).

In response to the request out signal, the device control unit 12 activates the acknowledge request out line 58. This acknowledge request out signal is supplied by way of OR circuit 124 and AND circuit 125 to set a latch circuit 126. As a result, the next four occurring oscillator pulses on line 127 cause edge trigger circuits 128 and 128a to produce a strobe out pulse of precisely fixed duration on the strobe out line 59. The duration of this strobe out pulse is equal to twice the time interval between the leading edges of two successive oscillator pulses. This strobe out pulse on line 59 is supplied to the device control unit 12 and causes such unit to load in the information residing in the device tag register 82 and the device data register 32, such information then appearing on the tag bus 54 and the device data bus 28, respectively. This strobe out pulse also resets the request out flip flop 121 by way of OR circuit 129. This terminates the initial selection sequence for the particular I/O device in question.

For the case of cycle steal data transfer operations, the information supplied to the device control unit 12 during the initial selection sequence provides the device control unit 12 with the control information it needs to perform the desired data transfer operations with the desired I/O device. After the initial selection sequence, the device control unit 12 takes over and signals the I/O controller 10 each time the device control unit 12 is ready for the transfer of a data word. More particularly, the device control unit 12 activates the request in line 55 each time it is ready for the transfer of a data word. In response thereto, AND circuit 130 supplies an acknowledge request in signal back to the device control unit 12, provided one or the other of AND circuits 131 and 132 is supplying a binary one level to the second input of the AND circuit 130. For an output (device write) transfer, AND circuit 131 provides the one level signal when the device data register (DDR) 32 becomes full. For an input mode (device read) transfer, the AND circuit 132 provides the one level signal when the device data register 32 is not full (empty).

What happens next depends on whether the transfer is an input mode transfer or an output mode transfer. For the case of an input mode transfer, the device control unit 12 responds to the acknowledge request in signal by sending in a strobe in pulse on line 60. As indicated in FIG. 2, this causes the data word appearing on the device data bus 28 to be loaded into the device data register 32. As will be seen in connection with FIG. 11, this strobe in pulse also sets a device data register full indicator latch in the bypass transfer controls 80 to a DDR full condition.

For the case of an output mode transfer, on the other hand, the occurrence of the acknowedge request in signal on line 56 causes the edge triggers 128 and 128a to produce a strobe out pulse on line 59. This is accomplished by means of AND circuit 133, OR circuit 124, AND circuit 125 and latch circuit 126. This strobe Out pulse causes the device control unit 12 to load in the data word then appearing on the device data bus 28. As will be seen in connection with FIG. 11, this strobe Out pulse on line 59 also resets the DDR full latch in the bypass transfer controls 80 to a "Not Full" or "Empty" condition.

Figure 11:
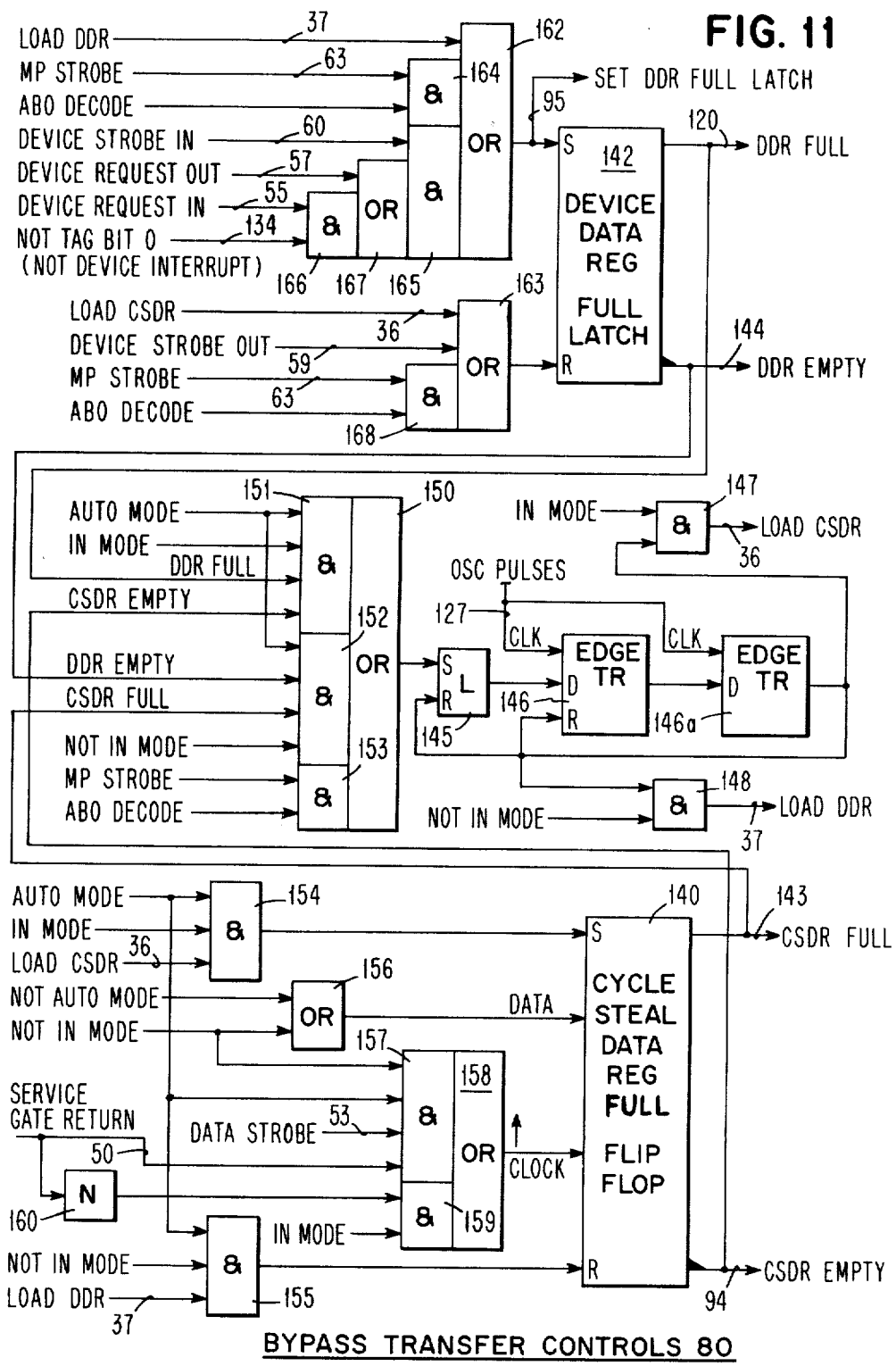
FIG. 11 is a logic circuit diagram showing in detail the internal construction of the bypass transfer controls of FIG. 2.

FIG. 11 Bypass Transfer Controls

Referring to FIG. 11, there is shown in detail the internal construction of the bypass transfer controls 80 of FIG. 2. For simplicity of illustration, some of the NOT circuits have been omitted with respect to some of the input signal lines in those instances where such omission will not cause confusion. For example, some of the input lines are labeled "not in mode". Such "not in mode" signals are obtained by taking the "in mode" output of mode latch 78 and running it through a NOT circuit. Alternatively, the "not in mode" signals may be obtained from the complement output (not shown) of the mode latch 78. Similar considerations apply to a FIG. 11 input line labeled "not auto mode", in this case, the mode latch in question being the auto mode latch 77.

The bypass transfer controls shown in FIG. 11 include two primary bistable circuits, namely, a cycle steal data register (CSDR) full flip flop circuit 140 and a device data register (DDR) full latch circuit 142. These circuits 140 and 142 are one-bit indicator circuits for keeping track of when the cycle steal data register 30 and the device data register 32 are full and empty. In particular, the "set" state of the CSDR full flip flop 140 indicates that the cycle steal data register 30 is full and the "reset" state of the CSDR full flip flop 140 indicates that the cycle steal data register 30 is empty. In a similar vein, the "set" state of the DDR full latch 142 indicates that the device data register 32 is full and the "reset" state of the DDR full latch 142 indicates that the device data register 32 is empty.

The CSDR empty output line 94 of the flip flop 140 is the complement of the CSDR full output line 143 of such flip flop 140. In a similar vein, the DDR empty output line 144 of the latch 142 is the complement of the DDR full output line 120 of such latch 142.

The circuitry shown in the middle third of FIG. 11 is used to generate the Load CSDR and Load DDR pulses which are, respectively, used to transfer data from the device data register 32 to the cycle steal data register 30 and vice versa. The portion of this circuitry represented by latch circuit 145 and edge trigger circuits 146 and 146a constitutes a precision pulse generator for generating one pulse of very precise duration each time a new pulse is applied to the set input of the latch circuit 145. In particular, a new pulse applied to the set input of latch 145 switches same to its set state. This places a binary one level on the data (D) input line of the edge trigger 146. The leading edge of the next occurring oscillator pulse on line 127 (the clock input line of edge trigger 146) is effective to switch the edge trigger 146 to the one state or set state. This supplies a one level to the data input of the next trigger 146a. The next oscillator pulse turns on trigger 146a. The output of 146a is supplied back to reset the first trigger 146a to supply a zero level to the second trigger 146a. The third oscillator pulse then switches the trigger 146a back to the zero state. Thus, the resulting pulse appearing at the output of trigger 146a has a duration which is precisely equal to the time interval between the leading edges of two successive oscillator pulses.

The oscillator pulses appearing on line 127 are obtained from the timing pulse oscillator circuit (not shown) which is used to provide the timing pulses for the microprocessor 33.

Each pulse produced by the edge trigger 146a is supplied to a pair of AND circuits 147 and 148. When operating in the input mode, AND circuit 147 is enabled and AND circuit 148 is disabled. This passes the edge trigger pulse to the output line 36 to provide thereon the load CSDR pulse. Conversely, when operating in the output mode (not in mode), the AND circuit 148 is enabled and the AND circuit 147 is disabled. This causes the edge trigger pulse to be passed to the output line 37 to provide thereon the load DDR pulse.

At the appropriate moments, pulses are supplied to the set input of the latch 145 by way of an OR circuit 150. Depending on the operating mode, these pulses are developed by the appropriate one of AND circuits 151, 152 and 153. When operating in the automatic input mode, these pulses are provided by the AND circuit 151. In particular, at the moment of joint occurrence of the DDR full and CSDR empty conditions, AND circuit 151 produces a one level output. This is supplied by way of OR circuit 150 to switch the latch 145 to the set state. Shortly thereafter, the load CSDR pulse is produced on line 36. As will be seen, this load CSDR pulse sets the CSDR full flip flop 140 to the full condition and resets the DDR full latch 142 to the empty condition. This returns the output of AND circuit 151 to the binary zero level.

When operating in the automatic output mode, the set signals for the latch 145 are produced by the AND circuit 152. One such set signal is provided for each joint occurrence of the DDR empty and the CSDR full conditions.

When desired, the microprocessor 33 can cause a set pulse to be supplied to the latch circuit 145. This is accomplished by means of the AND circuit 153 when it receives the MP strobe pulse and the appropriate ABO decode signal.

Considering now the logic circuitry for setting and resetting the CSDR full flip flop 140, it is first noted that the flip flop 140 can be set by the occurrence of a binary one level at the output of an AND circuit 154. This AND circuit 154 is used to cause a setting of the flip flop 140 when operating in the automatic input mode and at the moment when data is transferred from the device data register 32 to the cycle steal data register 30 by the load CSDR pulse. It is further noted that the flip flop 140 can be reset to its empty state by means of an AND circuit 155. Such a resetting occurs when operating in the automatic output mode and at the moment the data word is transferred from the cycle steal data register 30 to the device data register 32 by the load DDR pulse.

The remainder of the flip flop 140 input logic circuitry is used to provide sets and resets in connection with the transfers of data words from and to the host processor 11. In particular, an OR circuit 156 supplies to the data input of flip flop 140 a binary zero level when operating in an automatic input mode and a binary one level when operating in an automatic output mode. A positive-going pulse edge on the clock input line of flip flop 140 switches the flip flop 140 to whatever state is indicated by the binary level on its data input line.

When operating in the automatic output mode, the positive-going pulse edge for the clock input is provided by an AND circuit 157 by way of an OR circuit 158. In particular, the leading edge of the data strobe pulse sent out by the host processor 11 via line 53 provides the positive-going pulse edge which switches the flip flop 140, in this case, to a one state ("full" state) since the data input line is at the one level at this time.

When operating in an input mode, the positive-going pulse edge for the clock input of flip flop 140 is provided by way of AND circuit 159 and OR circuit 158. In fact, it is the trailing edge of the service gate return signal on line 50 which produces the positive-going pulse edge for the clock input of flip flop 140. In particular, the service gate return signal is inverted by a NOT circuit 160 so that the trailing edge of such signal is a positive-going pulse edge. By this time, that is, by the trailing edge of the service gate return, the host processor 11 has taken in the data word from the cycle steal data register 30. Hence, this is the appropriate time to reset the flip flop 140 to the CSDR empty condition. The flip flop 140 is reset because the OR circuit 156 provides a binary zero level to the data input for the automatic input mode.

Considering now the logic circuitry for setting and resetting the DDR full latch 142, it is noted that such latch is set to the DDR full state each time a pulse appears at the output of an OR circuit 162 and is reset to the DDR empty state each time a pulse appears at the output of an OR circuit 163. Considering first the logic which drives the OR circuit 162, three possibilities exist. The first possibility is that the DDR full latch is set each time a data word is transferred from the cycle steal data register 30 to the device data register 32. This is accomplished by the load DDR pulse appearing on line 37.

The second case is where the DDR full latch 142 is set by the microprocessor 33. This is accomplished by way of AND circuit 164.

The third case occurs when data is transferred from the device control unit 12 to the device data register 32 via the device data bus 28. In this case, the setting of latch 142 to the DDR full state is accomplished by way of AND circuit 165. The key input for accomplishing this is the device strobe in pulse when it appears on the line 60. For cycle steal mode transfers, this device strobe in pulse is bracketed by a device request in signal on line 55 and the not tag bit 0 line 134 is at the binary one level. Thus, at the time of occurrence of the device strobe in pulse on line 60, an AND circuit 166 is providing a binary one level signal to the second input of AND circuit 165 by way of OR circuit 167. The device strobe in pulse on line 60 and the device request out signal on line 57 are used to provide the latch set signal when receiving information from the device control unit 12 during the initial selection sequence for an I/O device.

Considering now the logic for resetting the DDR full latch 142 to the empty state, three possible ways of accomplishing this are provided. The first case is that the latch 142 is reset to the empty state by the load CSDR pulse which transfers a data word from the device data register 32 to the cycle steal data register 33. The second case is that the latch 142 is reset to the empty state by the device strobe out pulse on line 59 which transfers a data word from the device data register 32 to the device control unit 12. The third case is that the DDR full latch can be reset to the empty state by the microprocessor 33. This is accomplished by means of the MP strobe and the ABO decode supplied to the input of an AND circuit 168.

Figure 12:
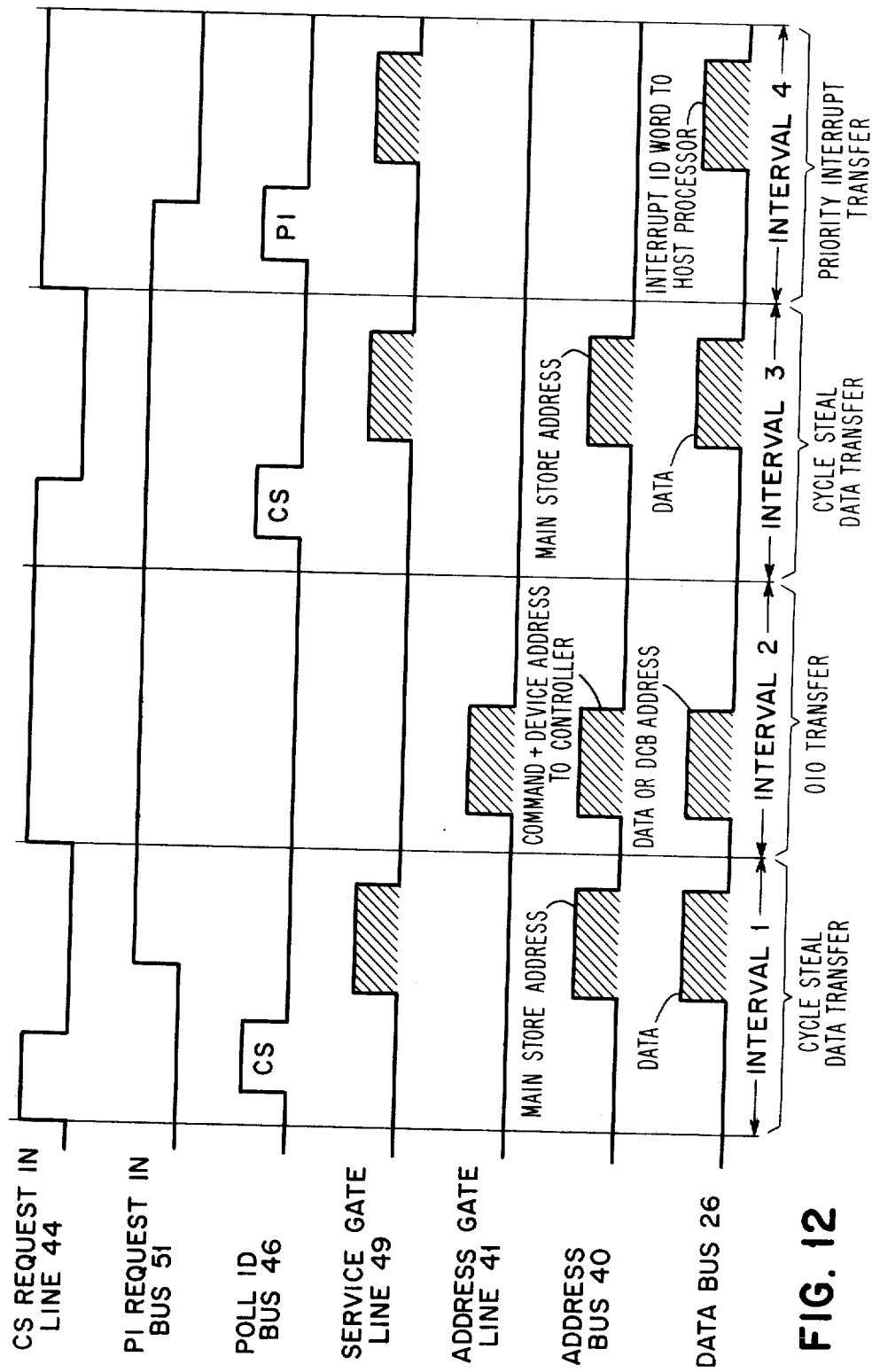
FIG. 12 is a timing diagram used for explaining certain concurrent processing capabilities of the FIG. 2 controller.

FIG. 12 Description of Concurrent Controller Operations

Referring to FIG. 12, there will now be explained a more or less representative example shown how the I/O controller 10 can concurrently perform different operations for different ones of the I/O devices 13–16. In particular, an example will be given showing how the controller 10 can present interrupts to the host processor 11 and service additional I/O commands from the host processor 11 concurrently with the transfer of data via the automatic bypass mechanism.

With reference to FIG. 2, a major factor which which makes possible this kind of concurrent operation is the provision of three separate data registers, each of which is connected to the channel data bus 26. These registers are the cycle steal data register 30, the OIO register 71 and the interrupt ID register 85. As mentioned, the cycle steal data register 30 is used as part of the automatic bypass mechanism. The OIO register 71, on the other hand, enables the servicing of additional I/O commands from the host processor 11 concurrently with the automatic transfer of data via the cycle steal data register 30. In a similar vein, the interrupt ID register 85 enables presentation of interrupts to the host processor 11 concurrently with the automatic transfer of data via the cycle steal data register 30.

With reference to FIG. 12, the example there shown is divided into four successive time intervals labeled as Intervals 1 through 4. Cycle steal data transfers via the cycle steal data register 30 are performed during Intervals 1 and 3, while the servicing of an I/O command for a different I/O device is performed during Interval 2 and the presentation of an interrupt request to the host processor 11 is performed for a third I/O device during Interval 4.

FIG. 12 is drawn for the case where the automatic bypass mechanism would like to present a new cycle steal request in signal at the beginning of each of the four time intervals. In other words, in the absence of the new I/O command and the priority interrupt, the cycle steal request in waveform would show the same kind of pulse at the beginnings of Intervals 2, 3 and 4 as is shown at the beginning of Interval 1.

For sake of example, it is assumed that an automatic bypass transfer is in progress via cycle steal data register 30, bypass data bus 31 and device data register 32 for the first I/O device 13. In this regard, it should be noted that the automatic bypass mode operations always communicate with the host processor 11 in the cycle steal mode. For this example, then, the CS request in waveform of FIG. 12 is being produced by the controller 10 on behalf of the first I/O device 13. At some point in time (approximately the middle of Interval 1 in FIG. 12), a priority interrupt (PI) request is presented to the host processor 11 on behalf of a second I/O device, for example, the I/O device 14. This is accomplished by the activation of a particular line in the PI request in bus 51 and is indicated by the positive-going step in the PI request in waveform of FIG. 12. The host processor 11, however, does not get around to responding to this PI request until Interval 4. In the meanwhile, the automatic bypass mechanism continues its cycle steal data transfers as often as possible.

At about the beginning of Interval 2, the host processor 11 executes an OIO instruction for a third I/O device, for example, the I/O device 15. As part of such execution, host processor 11 activates the address gate control line 41 and places the two words of the IDCB on the channel address bus 40 and the channel data bus 26, respectively. The presentation of the address gate signal on line 41 causes the cycle steal request In signal on line 44 to be temporarily ignored by the host processor 11.

During the initial selection sequence for the I/O command of Interval 2, the command byte on the address bus 40 is set into the command register 70 and the data or DCB address word on the channel data bus 26 is set into the OIO register 71. After this is accomplished, the address gate signal on line 41 is turned off and the automatic bypass mechanism is allowed to resume its cycle steal data transfers, such resumption being indicated by the cycle steal data transfer shown in time Interval 3. While this is going on, the microprocessor 33 takes in the command byte from the command register 70 and the data or DCB address word from the OIO register 71.

If this new I/O command should be of a type not requiring a data transfer, then the microprocessor 33 may commence further servicing of such I/O command. Examples of such non-data transfer commands are read status commands, prepare commands and various types of control commands. For a command of this type, the microprocessor 33 may shortly thereafter cause the controller 10 to present a priority interrupt for such command. If, on the other hand, the new I/O command calls for a transfer of data, then such command and its accompanying data or DCB address are stacked in a queue in the microprocessor storage unit and held there for future servicing after the current automatic data transfer operation is completed. In any event, acceptance of the I/O command by the controller 10 means that the host processor 11 is relieved of the necessity of having to keep representing the command when the controller is busy with a previously started automatic transfer operation.

Interval 4 shows the case where the host processor 11 finally gets around to servicing the priority interrupt request first presented during Interval 1. In particular, the host processor 11 sends out a priority interrupt poll ID, as opposed to a cycle steal poll ID. The coding of the interrupt poll ID corresponds to the priority level assigned to the controller 10. After capture of the priority interrupt poll by the controller 10, the host processor 11 sends out a service gate signal on line 49. In response thereto, the controller 10 sends in the address gate return signal (not shown in FIG. 12) and the interrupt ID word contained in the interrupt ID register 85 is transferred to the host processor 11 via the channel data bus 26. In this regard, the interrupt ID word was set into the interrupt ID register 85 by the microprocessor 33 at about the time the PI request is signal was first presented during Interval 1. After completion of the priority interrupt transfer of Interval 4, the host processor 11 can proceed to the servicing of the cycle steal request in signal pending on the cycle steal request in line 44.

On the device side of the controller 10, the controller 10 can accept device interrupt requests from the device control unit 12 concurrent with the performance of the automatic bypass data transfer operations. These device interrupt requests are received by the device interrupt register 83 and are periodically taken in by the microprocessor 33 for further servicing or for stacking in the appropriate device interrupt queue in the microprocessor storage unit.

The foregoing example illustrates the versatility of the controller 10 where multiple I/O devices are connected thereto. Of course, where desired, the controller 10 can be used to handle only a single I/O device. In such case, the controller 10 continues to provide improved performance relative to prior art controllers because of the presence in the controller 10 of the new and improved automatic high speed data bypass mechanism whereby data may be transferred from the host processor to the I/O device or vice versa without having to pass through the microprocessor 33 and without requiring any intervention on the part of the microprocessor 33 during such automatic transfer.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. An input/output controller for transferring data between a host processor and one or more input/output units and comprising:

first plural-bit data storage means for sending data to and receiving data from a host processor;

second plural-bit data storage means for sending data to and receiving data from an input/ouput unit;

a microprocessor for controlling input/output activities;

circuitry for transferring data between the first data storage means and the microprocessor;

circuitry for transferring data between the microprocessor and the second data storage means;

a data transfer bus providing a direct data transfer connection between the first and second data storage means;

selectively operative automatic transfer control circuitry coupled to the first and second data storage means and effective, when operative, for automatically and sequentially transferring multiple units of data between the host processor and an input/output unit via the first and second data storage means and the direct data transfer bus and without requiring any action on the part of the microprocessor, said automatic transfer control circuitry further including:

first load signal generating circuitry operative during input data transfer operations for supplying load signals to the first storage means when the second storage means is not empty and the first storage means is not full;

and second load signal generating circuitry operative during output data transfer operations for supplying load signals to the second storage means when the first storage means is not empty and the second storage means is not full;

and auto mode circuit means responsive to a start-up signal from the microprocessor for rendering the automatic transfer control circuitry operative.

2. An input/output controller in accordance with claim 1 wherein the first data storage means is a plural-bit data register.

3. An input/output controller in accordance with claim 1 wherein the second data storage means is a plural-bit data register.

4. An input/output controller in accordance with claim 1 wherein both the first and the second data storage means are plural-bit data register.

5. An input/output controller in accordance with claim 4 wherein the automatic transfer control circuitry further includes:

first status indicating circuitry responsive to host processor transfer indicative signals and to the first and second load signals for providing indications of the full/empty status of the first data register;

second status indicating circuitry responsive to input/output unit transfer indicative signals and to the first and second load signals for providing indications of the full/empty status of the second data register;

and circuitry for coupling the first and second status indicating circuitry to the first and second load signal generating circuitry for controlling the operation thereof.

6. An input/output controller in accordance with claim 1 wherein the automatic transfer control circuitry includes:

input transfer control circuitry operative during input data transfer operations for automatically transferring data from the second data storage means to the first data storage means via the direct data transfer bus;

and output transfer control circuitry operative during output data transfer operations for automatically transferring data from the first data storage means to the second data storage means via the direct data transfer bus.

7. An input/output controller in accordance with claim 6 and further including circuitry operative when the automatic output transfer control circuitry is operative for supplying service requests to the host processor when the first data storage means is not full.

8. An input/output controller in accordance with claim 6 and further including:
circuitry operative when the automatic input transfer control circuitry is operative for supplying service requests to the host processor when the second data storage means is not empty;
and circuitry operative when the automatic input transfer control circuitry is operative for delaying acceptance of input data by the host processor if the first data storage means is empty.

9. An input/output controller in accordance with claim 6 wherein:
both the first and the second data storage means are plural-bit data registers for holding a plural-bit unit of data;
and the controller includes a lookahead mechanism operative during automatic input data transfer operations for sending service requests to the host processor before each unit of data being transferred is passed from the second data register to the first data register via the direct data transfer bus.

10. An input/output controller in accordance with claim 1 wherein the host processor includes a main storage unit and the input/output controller further includes:
plural-bit address counter circuitry for supplying plural-bit main storage addresses to the host processor when the automatic transfer control circuitry is operative;
circuitry for enabling the microprocessor to load a starting main storage address into the address counter circuitry before the commencement of automatic data transfer operations;
and circuitry for automatically incrementing the address counter circuitry as each unit of data is transferred to or from the host processor during the automatic data transfer operations.

11. An input/output controller in accordance with claim 1 and further including:
third plural-bit data storage means for transferring command information from the host processor to the microprocessor concurrently with the automatic transfer of data via the direct data transfer bus;
and fourth plural-bit data storage means for transferring interrupt information from the microprocessor to the host processor concurrently with the automatic transfer of data via the direct data transfer bus.

12. An input/output controller for transferring data between a host processor and one or more input/output units and comprising:
interface connection means for coupling the input/output controller to a host processor input/output interface bus;
a microprocessor located in the input/output controller for controlling input/output activities;
first plural-bit register means coupled to the interface connection means for sending data to and receiving data from the host processor;
second plural-bit register means for sending data to and receiving data from an input/output unit;
automatic data transfer circuitry coupled to the first register means for automatically transferring data between the host processor and an input/output unit via the first register means and independently of the microprocessor, said automatic transfer control circuitry further including:
first load signal generating circuitry operative during input data transfer operations for supplying load signals to the first register means when the second register means is full and the first register means is empty;
and second load signal generating circuitry operative sduring output data transfer operations for supplying load signals to the second register means when the first register means is full and the second register means is empty;
third plural-bit register means coupled to the interface connection means and to the microprocessor for receiving host processor command information and supplying same to the microprocessor concurrently with the automatic transfer of data via the automatic data transfer circuitry;
and fourth plural-bit register means coupled to the interface connection means and to the microprocessor for receiving interrupt information from the microprocessor and supplying same to the host processor concurrently with the automatic transfer of data via the automatic data transfer circuitry.

13. An input/output controller in accordance with claim 12 and further including circuitry for enabling the microprocessor to provide an initial set-up of the automatic data transfer circuitry before commencement of automatic transfer operations by such circuitry.

* * * * *